United States Patent Office 2,778,045
Patented Jan. 22, 1957

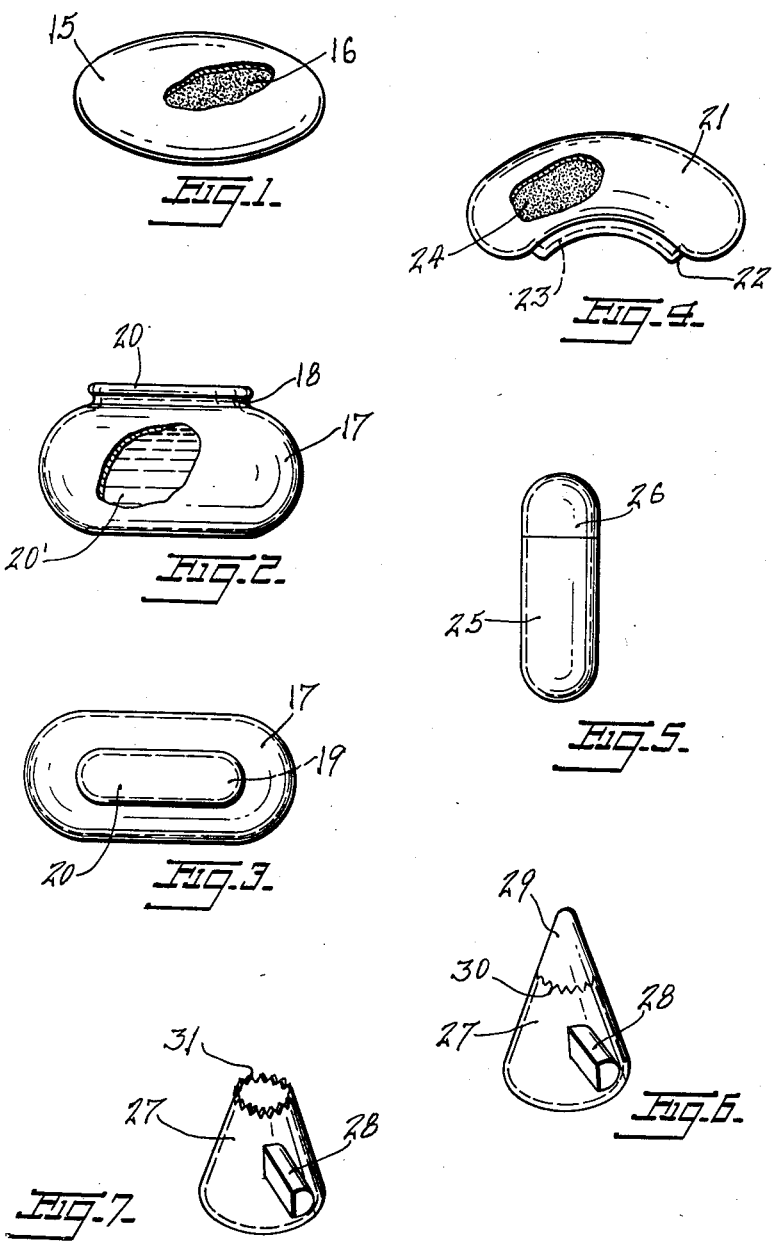

2,778,045

DENTIFRICE-CONTAINING CAPSULES

Isaiah Bly and Simon Bly, Jr., Bronx, N. Y.

Application October 31, 1952, Serial No. 317,892

1 Claim. (Cl. 15—131)

This invention relates to new and useful improvements in dentifrice, mouth wash and antiseptic gargle dispensing means.

More particularly, the present invention proposes the construction of an improved capsule which can be readily and easily broken by the teeth to release a dentifrice or which may be removed by sucking or by dissolving the same in the mouth, for application either by a brush or by the capsule itself used as a brush.

Another object of the present invention proposes forming the capsule as a thin shell so that it will encase an antiseptic gargle or mouth wash and making the shell of brittle flavored edible material for easily crushing by the teeth or which may be dissolved by the heat of the mouth to free the contents of the shell and to leave a pleasant refreshing taste in the mouth.

Still further, the present invention proposes constructing the capsule as a shell with a clearly marked weakened portion between the main body of the shell and a protruding portion so that the protruding portion can be bitten off and the contents of the shell applied to the teeth or gums by the portion of the shell remaining.

The present invention further proposes the provision of a discardable handle for convenience in using the shell as a dentifrice applicator and having the contents of the capsule contained under pressure therein for quick, easy removal.

For further comprehension of the invention, and of the objects and advantages thereof, reference will be had to the following description and accompanying drawings, and to the appended claim in which the various novel features of the invention are more particularly set forth.

On the accompanying drawings forming a material part of this disclosure:

Fig. 1 is a side view of a capsule, a part of the capsule being broken away to show the contents therein.

Fig. 2 is a view similar to Fig. 1, but illustrating a modification thereof.

Fig. 3 is a top plan view of the capsule shown in Fig. 2.

Fig. 4 is a view similar to Figs. 1 and 2, but illustrating another modification.

Fig. 5 is a top plan view of another capsule illustrating a further modification.

Fig. 6 is a perspective view of another capsule illustrating the present invention.

Fig. 7 is a view similar to Fig. 6 but showing the top of the capsule bitten off or otherwise removed.

The capsule, in accordance with the first form illustrated in Fig. 1, has a thin hollow brittle shell 15 of edible material such as hard candy, crystallized sugar, brittle candy coatings.

A preferable material for the shell is calcium flavored with mint or other flavoring to leave a pleasant refreshing taste in the mouth and at the same time to help build up strong teeth. The calcium may be in the form of calcium tablets commonly prescribed for teeth building purposes. A milk of magnesia base may also be used if desired.

A dentifrice 16 is enclosed in the shell 15 completely encased by the shell. The dentifrice may be a toothpaste, tooth powder or a liquid detergent or other tooth cleansing agent.

Shell 15 should be thick enough to allow the capsules to withstand reasonable handling and bumping against one another but thin enough to crush easily when bitten by the teeth. The capsules may be of any convenient size but preferably small enough to be dispensed by vending machines in public places such as the wash rooms of restaurants, train and bus stations, airports and the like as well as on trains, planes and ships. Each capsule holds enough dentifrice for one application.

The modification illustrated in Fig. 2, is characterized by the provision of a thin hollow brittle shell 17 of edible material similar to shell 15 of Fig. 1, but having a weakened portion 18 adapted to break by biting pressure and provide an exit opening 19 (see Fig. 3) of predetermined shape. A protruding portion 20 extends from the shell 17 and the weakened portion 18 lies between the shell and the protruding portion. The shell is filled with an antiseptic gargle or mouth wash 20, which is readily available by biting off the protruding portion 20 at the weakened juncture 18. The shell 17 may be flavored also. Shell 15 of Fig. 1, may be filled with antiseptic gargle or mouth wash if desired, the contents of the shell being available for use when the shell is broken in the mouth by crushing with the teeth.

In the modification illustrated in Fig. 4, the hollow brittle shell 21 is kidney shaped being made in arcuate form with a protruding portion 22 extending from the concave side of the shell. The curvature of the shell is similar to the curvature of the teeth and the mouth. Protruding portion 22 has a weakened section 23 extending around it and when this section is severed by the teeth, dentifrice 24 in the shell is free to come out the opening. The dentifrice 24 may be applied with a brush or the remaining part of the protruding portion 22 can be used as a brush to apply the dentifrice to the teeth and gums.

Shell 21 is water soluble, edible and flavored. To facilitate removal of the dentifrice, the dentifrice 24 may be stored under pressure in the shell.

The modification illustrated in Fig. 5, is characterized by the provision of a hollow brittle shell 25 oblong in shape having a clearly marked weakened portion 26 encircling it at one end. The shell adjacent the weakened portion is adapted, as by scoring and the like, for use as a brush in applying the dentifrice.

In the preferred form illustrated in Figs. 6 and 7, the capsule is made conical in shape with a hollow brittle shell 27, of edible material, preferably flavored, and a discardable handle 28, removably secured to the shell. The tip 29 of the shell has below and encircling it, a weakened portion 30 so that the tip may be bitten off or otherwise removed as shown in Fig. 7. When the tip 29 is removed, the edge 31 exposed provides a roughened surface (the weakened portion 30 being scored to break in this manner) for brushing the teeth and massaging the gums. The shell 27 can then be eaten and the handle discarded. In this manner one's fingers need never touch the shell.

It is to be understood that the dentifrice may also be molded in various shaped tablet forms without any coating or encasement.

While we have illustrated and described the preferred embodiment of our invention, it is to be understood that we do not limit ourselves to the precise construction herein disclosed and the right is reserved to all changes and modifications coming within the scope of the invention as defined in the appended claim.

Having thus described our invention, what we claim as new, and desire to secure by United States Letters Patent is:

A dentifrice capsule comprising a thin hollow brittle shell of edible material conical in shape, a discardable handle removably connected to the shell, and a dentifrice in the shell completely encased therein, said shell having a weakened portion encircling its tip for the tip to be bitten off to remove the dentifrice and apply it with the remaining portion of the cone before the handle is discarded, said weakened portion being zig-zag in formation, said handle being connected to the shell adjacent its base and being disposed radially thereof.

References Cited in the file of this patent

UNITED STATES PATENTS

| | | |
|---|---|---|
| 106,773 | Blake | Aug. 30, 1870 |
| 943,945 | Liebich | Dec. 21, 1909 |
| 1,559,523 | Waring | Oct. 27, 1925 |
| 1,978,217 | Muckerjee | Oct. 23, 1934 |
| 2,004,957 | Messner | June 18, 1935 |
| 2,031,233 | Stillwell | Feb. 18, 1936 |
| 2,052,376 | Zellers | Aug. 25, 1936 |
| 2,342,372 | Scherer | Feb. 22, 1944 |

FOREIGN PATENTS

| | | |
|---|---|---|
| 520,438 | Great Britain | Apr. 24, 1940 |